(12) United States Patent
Okoli et al.

(10) Patent No.: US 11,806,941 B2
(45) Date of Patent: Nov. 7, 2023

(54) MECHANICAL PART RETENTION FEATURES FOR ADDITIVELY MANUFACTURED STRUCTURES

(71) Applicant: DIVERGENT TECHNOLOGIES, INC., Los Angeles, CA (US)

(72) Inventors: Chukwubuikem Marcel Okoli, Los Angeles, CA (US); David Brian TenHouten, Los Angeles, CA (US); Muhammad Faizan Zafar, Los Angeles, CA (US); Antonio Bernerd Martinez, Los Angeles, CA (US); Lukas Philip Czinger, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 81 days.

(21) Appl. No.: 16/999,494

(22) Filed: Aug. 21, 2020

(65) Prior Publication Data
US 2022/0055317 A1 Feb. 24, 2022

(51) Int. Cl.
*B29C 65/78* (2006.01)
*B33Y 80/00* (2015.01)
(Continued)

(52) U.S. Cl.
CPC .......... *B29C 65/7844* (2013.01); *B29C 65/48* (2013.01); *B33Y 40/20* (2020.01); *B33Y 80/00* (2014.12); *B29L 2031/30* (2013.01)

(58) Field of Classification Search
CPC ..... B29L 2031/03; B33Y 80/00; B33Y 40/20; B29C 65/48; B29C 65/7844
See application file for complete search history.

(56) References Cited

U.S. PATENT DOCUMENTS 3,960,637 A   6/1976 Ostrow
4,250,596 A * 2/1981 Hara ................... B29C 66/1122
                                                          52/309.3
(Continued)

FOREIGN PATENT DOCUMENTS

CN     106804106 A    6/2017
CN     212386012 U    1/2021
(Continued)

OTHER PUBLICATIONS

US 9,202,136 B2, 12/2015, Schmidt et al. (withdrawn)
(Continued)

*Primary Examiner* — Daniel McNally
(74) *Attorney, Agent, or Firm* — ARENTFOX SCHIFF LLP

(57) ABSTRACT

Part retention features are disclosed for securing additively manufactured (AM) parts or for securing an AM part with another component, such as a node, panel, tube, extrusion, and the like, while an adhesive is being applied and/or while the adhesive is undergoing expansion due to a subsequent curing process. The retention features described herein can be used in the context of one or more AM parts such that the elements used to house the retention features (e.g., grooves, apertures, elastic elements, etc.) can advantageously be co-printed with the AM part, thereby removing a manufacturing step. The retention features also can be made with flatter profiles than existing solutions, making the overall structure smaller and less cumbersome to assemble.

10 Claims, 12 Drawing Sheets

(51) Int. Cl.
  *B29C 65/48* (2006.01)
  *B33Y 40/20* (2020.01)
  *B29L 31/30* (2006.01)

(56) References Cited

U.S. PATENT DOCUMENTS

| | | | |
|---|---|---|---|
| 5,203,226 A | 4/1993 | Hongou et al. | |
| 5,584,512 A * | 12/1996 | Carstensen | F16L 1/18 285/55 |
| 5,742,385 A | 4/1998 | Champa | |
| 5,854,431 A * | 12/1998 | Linker | G01N 1/40 73/863.23 |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,363,606 B1 | 4/2002 | Johnson, Jr. et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,849,150 B1 | 2/2005 | Schmidt | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwarzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |

(56) References Cited

U.S. PATENT DOCUMENTS

| | | |
|---|---|---|
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | FenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |

(56) References Cited

U.S. PATENT DOCUMENTS

| | | | |
|---|---|---|---|
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2003/0044553 A1* | 3/2003 | Ramanathan | B32B 1/02 428/35.8 |
| 2003/0071340 A1 | 4/2003 | Derderian | |
| 2006/0108783 A1 | 5/2006 | Ni et al. | |
| 2006/0243382 A1 | 11/2006 | Kilwin et al. | |
| 2006/0267368 A1* | 11/2006 | Earl | B60J 10/70 296/84.1 |
| 2007/0261787 A1 | 11/2007 | Malis | |
| 2010/0142359 A1 | 6/2010 | Sakata et al. | |
| 2014/0173879 A1* | 6/2014 | Negroni | B21J 15/142 29/525.01 |
| 2014/0212637 A1 | 7/2014 | Syvret et al. | |
| 2014/0241790 A1 | 8/2014 | Woleader et al. | |
| 2014/0277669 A1 | 9/2014 | Nardi et al. | |
| 2015/0289606 A1 | 10/2015 | Coakley et al. | |
| 2017/0050372 A1* | 2/2017 | Nielsen | F03D 1/0675 |
| 2017/0113344 A1 | 4/2017 | Schönberg | |
| 2017/0341309 A1 | 11/2017 | Piepenbrock et al. | |
| 2018/0022019 A1 | 1/2018 | Levine et al. | |
| 2018/0111329 A1 | 4/2018 | Tanaka et al. | |
| 2018/0290423 A1 | 10/2018 | Twelves, Jr. et al. | |
| 2018/0345599 A1* | 12/2018 | Bucknell | B29C 64/112 |
| 2018/0363691 A1* | 12/2018 | Gunner | F16B 5/0225 |
| 2019/0048912 A1* | 2/2019 | Czinger | B62D 23/005 |
| 2019/0061835 A1* | 2/2019 | TenHouten | B33Y 80/00 |
| 2019/0110366 A1 | 4/2019 | Gavagnin et al. | |
| 2019/0234815 A1 | 8/2019 | Rosinski et al. | |
| 2019/0374868 A1 | 12/2019 | Russell | |
| 2020/0147684 A1 | 5/2020 | Bowden, Jr. et al. | |

FOREIGN PATENT DOCUMENTS

| | | |
|---|---|---|
| EP | 3385076 A1 | 10/2018 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |
| WO | 2020104262 A1 | 5/2020 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for a corresponding International Application No. PCT/21/45445, dated Nov. 26, 2021, 10 pages.
Extended European Search Report in EP19882138, dated Aug. 9, 2022, 7 pages.
Third Office Action in CN201810970640.3, dated Jul. 8, 2022, 10 pages.
English language translation of the third Office Action in CN201810970640.3, dated Jul. 8, 2022.
Office Action in CN201911087428.3, dated Sep. 23, 2022, 10 pages.
Richardot, A., "How to connect to parts with 3D printed joints and snap fits," Sculpteo, Apr. 25, 2018 [retrieved from the Internet Mar. 14, 2023]. Retrieved from the Internet <URL:https://www.sculpteo.com/blog/2018/04/25/how-to-connect-two-parts-with-3d-printed-joints-and-snap-fits/>, 10 pages.

* cited by examiner

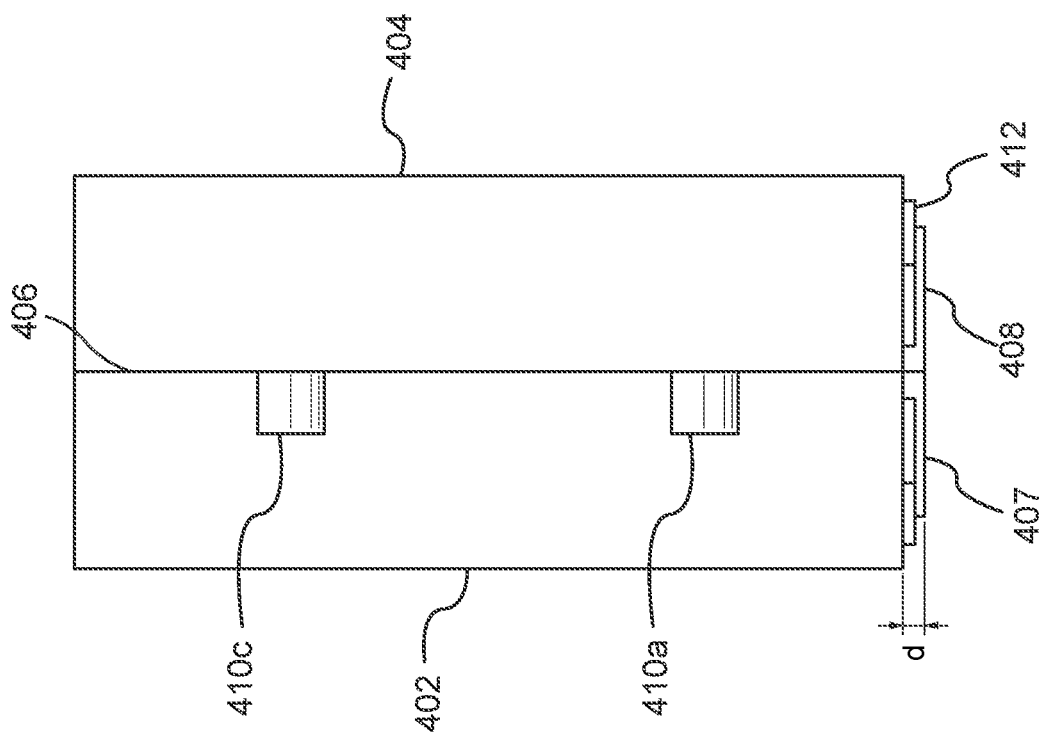
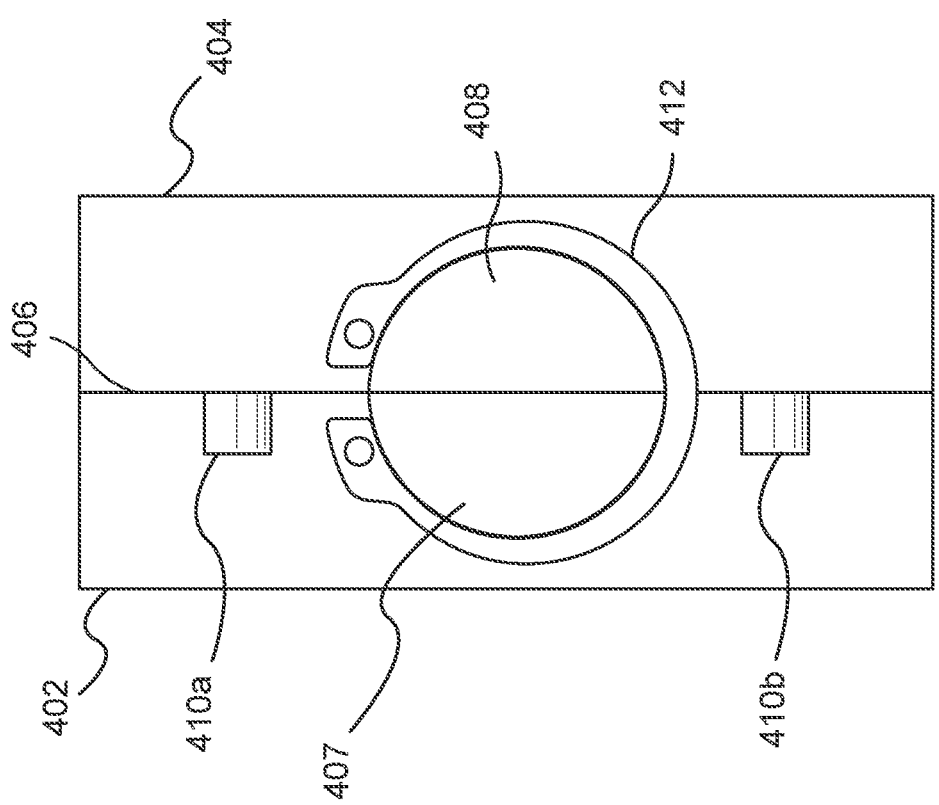
FIG. 4B
FIG. 4A

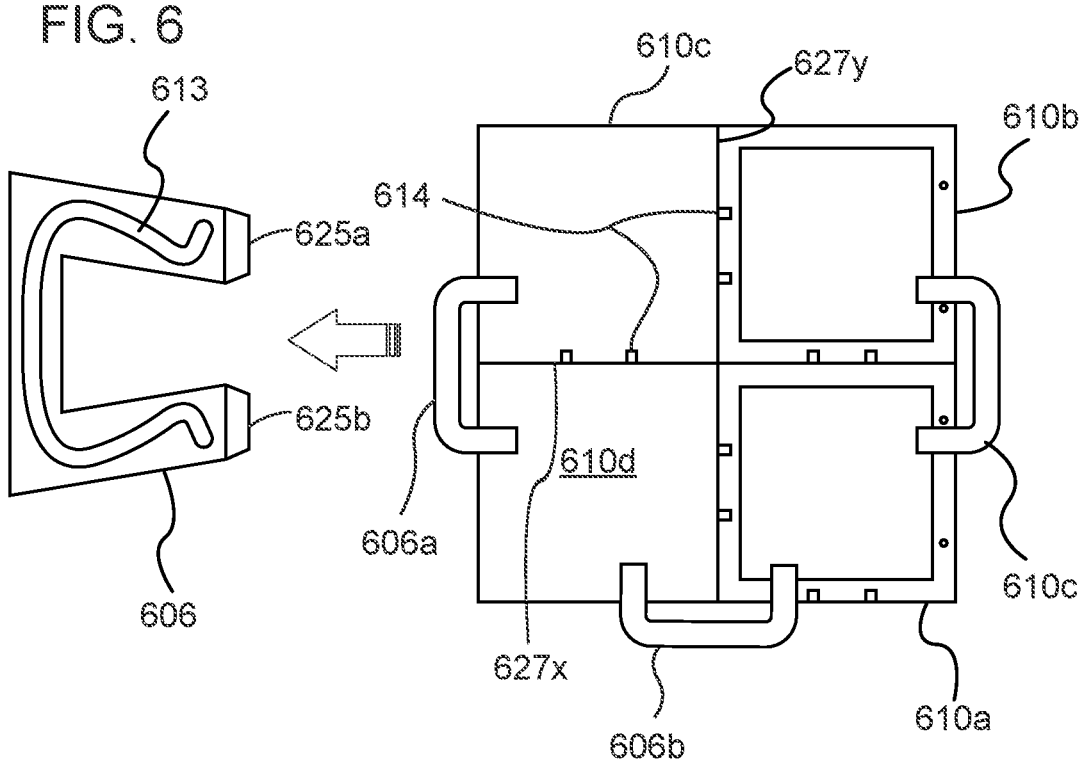
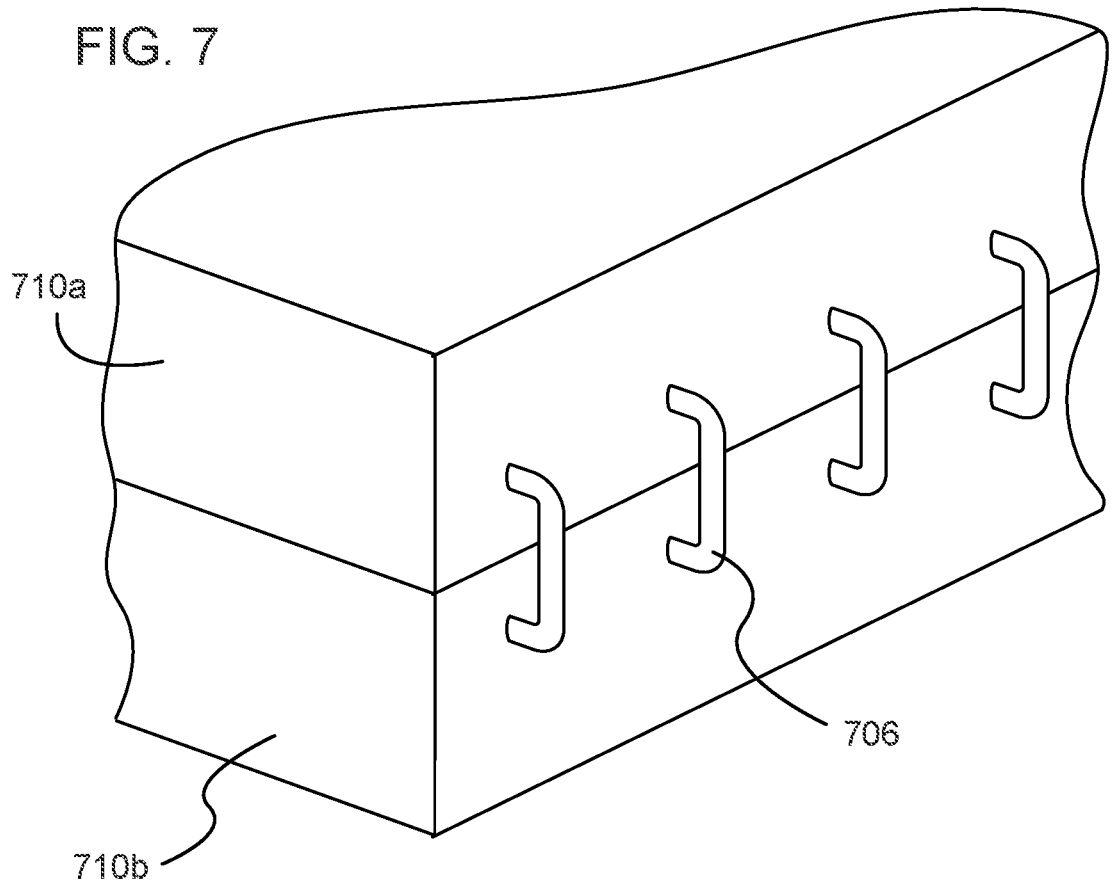

MECHANICAL PART RETENTION FEATURES FOR ADDITIVELY MANUFACTURED STRUCTURES

BACKGROUND

Field

The present disclosure relates generally to vehicles, aircraft, and other transport structures, and more specifically to mechanical part retention features for additively manufactured structures.

Background

Additive manufacturing (AM) has provided a significant evolutionary step in the development and manufacture of vehicles and other transport structures. For nearly a century prior to the introduction of AM, manufacturers have been relegated to the assembly line technique of vehicle production using conventional machining to construct and assemble vehicle parts. Because the machined parts are generally specific to a vehicle model design, and as acquiring new tooling to construct modified parts can be cost prohibitive, manufacturers have had limited flexibility to implement modifications to an established vehicle design. As a result, a manufacturing facility often uses assembly lines that are limited to producing a single vehicle model.

When an adhesive is initially applied between two parts, the force of the adhesive creates a positive pressure that tends to separate the two parts. This separation can adversely affect the integrity of the resulting connection, e.g., where the separation causes the parts to shift during manufacturing. Even when an adhesive is correctly applied in a manner that does not cause the parts to separate or misalign, the adhesive often expands or shifts as it is cured. The resulting position of the adhered parts may not comply with the connection as originally intended.

SUMMARY

Several aspects will be described more fully hereinafter with reference to various illustrative aspects of the present disclosure.

In one aspect of the disclosure, an apparatus includes a first additively manufactured (AM) part configured to connect to a second part via an adhesive applied at an interface between the first and second parts, and a retention element arranged for placement across the interface and configured to secure the first and second parts during at least application of the adhesive or curing of the adhesive.

In another aspect of the disclosure, an additively manufactured (AM) node includes a first portion configured to connect to another part via an adhesive applied to an interface between the node and the another part, and at least one retention element arranged for placement across the interface and configured to secure the node and the another part during at least application of the adhesive or curing of the adhesive.

In still another aspect of the disclosure, an apparatus includes a first additively manufactured (AM) part configured to connect to a second AM part via an adhesive applied at an interface between the first and second parts, and a retention element arranged for placement across the interface and securing the first and second parts during curing of the adhesive.

It will be understood that other aspects of the disclosure will become readily apparent to those skilled in the art based on the following detailed description, wherein they are shown and described in only several embodiments by way of illustration. As will be appreciated by those skilled in the art, these features, structures, methods and techniques can be realized with other embodiments without departing from the spirit and scope of the invention. Accordingly, the drawings and detailed description are to be regarded as illustrative in nature and not as restrictive.

BRIEF DESCRIPTION OF THE DRAWINGS

Various illustrations of aspects of the present disclosure will now be presented in the detailed description by way of example, and not by way of limitation, in the accompanying drawings, wherein:

FIG. 4A is a side view of two AM parts joined at an interface using a snap ring.

FIG. 4B is a top view of the two AM parts of FIG. 4A.

FIG. 6 is a top view of four parts coupled together using sprint-loaded clips as part retention features.

FIG. 7 is a partial perspective view of two parts coupled together using clips as part retention features.

DETAILED DESCRIPTION

Figure 3:
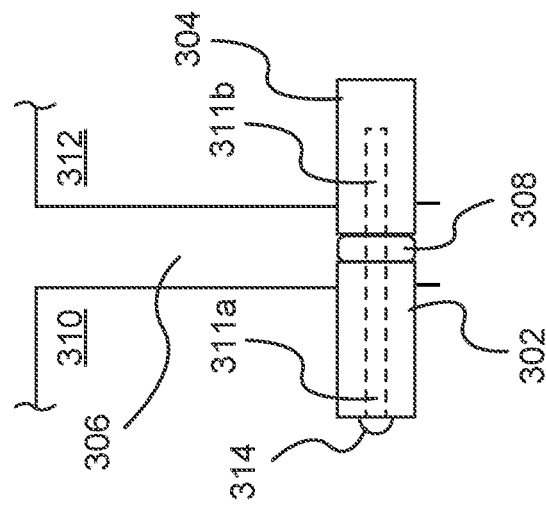
FIG. 3 is a front view of two parts joined at a part interface using a screw and shim.

The detailed description set forth below in connection with the drawings is intended to provide a description of exemplary embodiments of the present invention. The description is not intended to represent the only embodiments in which the invention may be practiced. The terms "exemplary" and "example" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or may be shown not drawn to scale, or omitted entirely, in order to avoid obscuring the various concepts presented throughout this disclosure.

The present disclosure is directed to mechanical part retention features used for holding structures in place during at least one of application and curing of a primary adhesive for bonding the structures together. The part retention features may in some embodiments be temporary and may be removed after the primary adhesive bond between the structures is formed. The structures to be bonded together may include, for example two (or more) AM parts, an AM part and a tube, panel, extrusion, or any other type of conventionally-manufactured part, or a COTS part. The disclosure covers the use of any adhesive to bond the parts, including conventional adhesives, and also including sealants or other materials that may have adhesive properties.

Being non-design specific, AM is capable of enabling construction of an almost unlimited variety of structures having diverse geometrical shapes and material characteristics. Different AM printers can provide these structures using a variety of materials, including metals, alloys and thermoplastics. In a new infrastructure proposed herein, AM can be used to design and build custom parts. Parts made via traditional machining and casting, together with widely available commercial off-the-shelf (COTS) parts, can be linked together in a modular form via these custom AM structures to form a chassis of a vehicle, fuselage of an aircraft, body of a sea vessel, and the like. AM modular parts can also be printed that form the interior of the transport structure. Design modifications are straightforward and can be effected by printing modified AM structures, which avoids the expense of acquiring new tooling.

As well, individual AM structures often need to be connected together, or to machined or COTS parts, to provide combined structures, e.g., to realize the above modular network or to form a complex interior assembly in a vehicle. Examples include node-to-node connections, node-to-panel connections, node-to-tube connections, and node-extrusion connections, among others. To connect an AM joint member with a vehicle body panel, for example, mechanical connectors (e.g., screws, clamps, etc.) may be used. Additionally, in some embodiments, an adhesive may be used to form a strong bond. For connecting these parts, a strict tolerance may often be required, meaning that the parts must be positioned to fit precisely in an established orientation. For example, the two parts to be adhered may need to be positioned to avoid direct contact with each other in order to avoid the possibility of galvanic corrosion. In general, an adhesive connection between the AM joint member and panel should result in an accurate fit. Thus, the AM joint member should not be misaligned with or offset from the body panel, for example, and the parts should remain properly oriented when a permanent bond is established.

Conventional attempts to address the problems described herein include the use of standoff tabs. Standoff tabs typically have large and cumbersome profiles that render processing steps more difficult, and are more often than not impracticable for the types of precision manufacturing steps involved in automated adhesive injection.

In various aspects of the disclosure, a node is used in the adhesion process. A node is an additively manufactured (AM) structure that includes a feature, e.g., a surface feature that facilitates sealing, adhering, etc., a socket, a receptacle, etc., for attaching to another structure, e.g., a tube, a panel, etc. In addition to their ability to interconnect different types of structures, nodes can be fabricated to perform a variety of different functions. For example, nodes can be used both as interconnects between structures and to route electrical circuitry in vehicles, or to enable fluid flow. Nodes can be 3-D printed by fusing a powder material. For example, a 3-D printer can melt and/or sinter at least a portion of the powder material in multiple layers to form the node. Nodes may be formed of one or more metal and/or non-metal materials. The node may be formed of a substantially rigid material. The materials in a node may include a metallic material (e.g. aluminum, titanium, stainless steel, brass, copper, chromoly steel, iron, etc.), a composite material (e.g. carbon fiber, etc.), a polymeric material (e.g. plastic, etc.), a combination of any of these materials and/or other materials, etc.

Nodes can be particularly useful in joint designs for connecting various parts of complex structures, for example. In some designs, nodes can allow for higher levels of dimensional tolerance acceptance that may be needed when assembling complex structures. Node-based designs can also allow for reduced weight, reduced post-processing, and increased ease of assembly. In addition, nodes can be used as sockets to adjust for tolerance in designs, and nodes can be co-printed with other parts, which takes advantage of a unique benefit of 3-D printing to simplify the assembly process.

Nodes can be connected to other nodes, panels, tubes, extrusions, and other parts. The connection may involve a mechanical connection, an adhesive connection, or some combination of the two. In embodiments where a size of the node exceeds the printer size (e.g., the size of the powder bed), the node may be 3-D printed as a plurality of subnodes, which may then be combined through adhesion.

Two parts may be adhered together in various ways. Adhesion may be performed manually, semi-automatically, or automatically. In the exemplary case of an AM node used in a node-to-panel connection, adhesive, sealant, and/or vacuum ports may be 3-D printed into the AM node to enable an automated constructor to inject adhesive at a preconfigured port. The automated constructor, such as a robot, may use an effector specifically designed to inject adhesive into an injection port. In some cases, only adhesive is injected. In other cases, sealant may be injected to circumscribe the areas to where the adhesive can flow. A vacuum may also be applied in some cases to facilitate flow of the adhesive into an adhesive region located at an interface between a surface of the AM node and a surface of the panel.

Whether the application of adhesive is performed manually or, by contrast, using automated means, the action of applying the adhesive generally results in a positive pressure being applied to the corresponding structures being adhered, which may result in the separation of the two structures being adhered. This separation, left unaddressed, may result in a combination of structures that is misaligned or otherwise improperly connected, or a wholesale failure of the connection where the parts simply separate far enough to avoid the effect of the adhesive.

Further, with or without the problem of positive pressure upon the application of the adhesive, many or most adhesives expand when curing, especially when being thermally cured. This expansion may similarly result in an improper alignment or other faulty connection of the parts being adhered. For example, the parts may have been designed to be in close proximity and/or actual contact at certain points. The expansion due to curing may cause the parts to separate.

In an aspect of the disclosure, one or more part retention features are disclosed. The part retention features may be mechanical structures operable for use in securing the two or more parts being connection such as through adhesion. The part retention features may cause the parts being connected to temporarily remain in position during either or both of application or curing of the primary adhesive used to bond the parts. The part retention features may be temporary in nature and may be removed after the adhesion process is complete. Alternatively, the part retention features may be permanent. In the latter case, the features may add no appreciable mass or other adverse effect to the adhered structure, and therefore it may not be necessary to add a removal step to the manufacturing process. The features in some cases may have alternative uses beyond those of part retention.

A number of the part retention features disclosed herein advantageously have flatter profiles than standoff tabs that may be used for similar purposes. Because the features do not stick out and potentially interfere with other adjacent structures, a manufacturing step of removing the features may be avoided. In other cases, a flatter profile means that the structures with smaller part retention features can be more compactly placed in any given area to conduct the adhesion process. In turn, less room is necessary for the part retention features, which features may be ancillary or temporary in nature.

Figure 1:
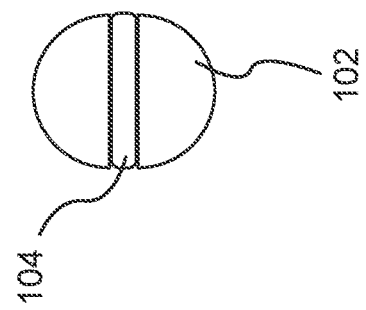
FIG. 1 is a front view of an AM part having a groove that retains a snap-ring.

FIG. 1 is a front view of an AM part having a groove that retains a snap-ring. FIG. 1 shows AM part 102 as used in a simple example to illustrate possible positioning of a part retention feature 104. In this example, part retention feature 104 is disposed in a groove (obscured from view) that can be 3-D printed into the AM part when the AM part is first constructed. The AM part 102 may be printed through any conventional means including, for example, using powder bed fusion (PBF) printing and using any of the technologies that are implemented with PBF printing. These technologies may include, for example, selective laser melting (SLM), selective laser sintering (SLS), selective heat sintering (SHS), electron beam melting (EBM), direct metal laser sintering (DMLS), among others. In various embodiments, the AM part 102 is printing using a different 3-D print technology such as fused deposition modeling (FDM). FDM AM may be ideal for printing various plastics, thermoplastics, etc. In general, AM part 102 may be additively manufactured using any known AM technique.

One advantage of the use of AM in combining parts is that, due to its design flexibility, AM may be used to render grooves and other features that may in turn be used directly in the part retention feature process. In FIG. 1, a part retention feature 104 may include an elastic band, a plastic structure, a metal snap-ring, etc. The presence of the groove for accommodating retention feature 104 enables the retention feature 104 to have a still lower profile in the AM part, thereby assisting in preventing retention feature 103 from interfering with other structures.

Figure 2:
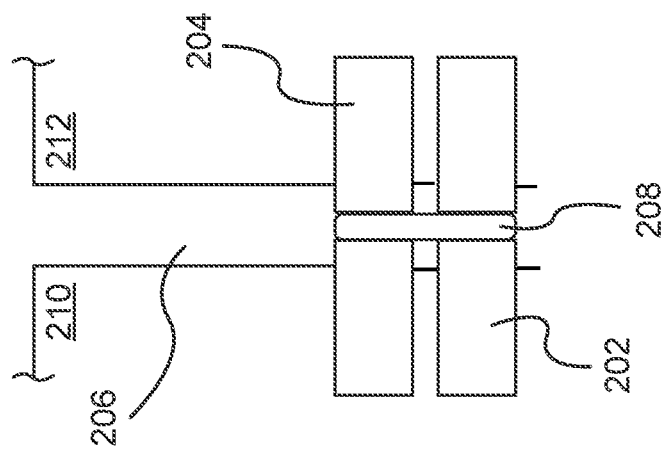
FIG. 2 is a front view of two parts joined at a part interface via a snap ring connection.

FIG. 2 is a front view of two parts joined at a part interface via a snap ring connection. The part interface 206 may include a space between two AM parts 202 and 204, such as AM nodes. In other embodiments, one of the parts 202, 204 may be another type of structure such as a panel, tube, extrusion, etc. The part interface 206 may include at least a portion of an area obscured by element 208 and extend down to a bottom portion of the figure, as shown. In the embodiment shown, AM part 202 extends across the part interface 206. AM part 204 also extends across the part interface 206.

In an embodiment, AM part 202 is co-printed or otherwise assembled to be a part of a larger structure 210 which is being adhered to structure 212. Similarly, AM part 204 may be co-printed with, or otherwise a part of, structure 212. In the case where structures 210 and 212 are AM nodes, the parts 202 and 204 may be co-printed with any desired shape, such as including a flat profile that does not extend out far from a surface of structures 210, 212 in a plane coming out of the page. In other embodiments, structures 210 and 212 need not be present and the parts for adhesion may be limited to AM parts 202 and 204.

Thus, in one embodiment, AM part 202 is co-printed with, and connected directly to, structure 210. AM part 202 may extend across interface 206 and overlap with (or reside near) AM structure 212, while not being directly connected with AM structure 212. AM part 202 may include a groove in the middle of the part, which is obscured from view by retention feature 208. Similarly, AM part 204 may be co-printed with and connected directly to AM structure 212. AM part 204 may extend across interface 206 and overlap with (or reside near) AM structure 210, while not being directly connected with AM structure 210. AM part 204 also includes a groove (obscured from view by retention feature 208) configured to align with the groove located on AM part 202.

In an embodiment, retention feature 208 is a snap ring designed to fit into the groove. Retention feature holds together AM parts 202 and 204 to allow the combination of structures to be adhered together in a primary step. As an example, an automated process may apply an adhesive to connect AM structures 210 and 212 (or a region thereof) in interface 206. The snap ring may be inserted into the groove to secure AM parts 202 and 204 together, and therefore to secure together AM structures 210 and 212.

In embodiments where the principal structures to be joined are AM parts 210 and 212, and AM parts 202 and 204 are merely provided to assist in securing AM parts 210 and 212, then AM parts 202 and 204 may be considered to be part of the retention features. In other embodiments where AM structures 210 and 212 are not present, then the snap ring 208 may instead constitutes the retention feature for parts 202 and 204 which are then adhered together via a primary adhesive.

In still another embodiment, snap ring 208 is additional or instead maintained on the AM parts 202 and 204 during the curing cycle for the primary adhesive in order to secure parts 202 and 204, and hence structures 210 and 212 during curing. Thus any expansion produced by the adhesive will be contained by the grip of the snap ring 208 as secured in the groove.

It is noteworthy that even though respective parts 202 and 204 are only directly connected to one of the two structures 210, 212 in this embodiment, the structures 210 and 212 remain secured together due to the action of the snap ring 208 place in the groove. The groove may be made deeper in some embodiments in order to flatten the profile of the snap ring 208.

FIG. 3 is a front view of two parts 302 and 304 joined at a part interface 306 using a screw 314 and a shim 308. As with FIG. 2, one or both parts 302, 304 may be AM parts. Further, in an embodiment, part 302 is co-printed with AM structure 310 and part 304 is co-printed with AM structure 312. In other embodiments, structures 310 and 312 need not be additively manufactured. For example, if structure 312 is a panel, it may be molded using a composite layup prior to be joined via an adhesive.

Unlike the embodiment in FIG. 2 where parts 202 and 204 extend across the interface 206, part 302 ends at the point where it joins with element 308. Similarly, part 304 extends until meeting at the other side of element 308. In an embodiment, parts 302 and 304 are respectively co-printed or otherwise formed to include internal holes 311a and 311b. A screw 314 may be inserted into the hole 311a in part 302 to extend across the interface 306 and into the corresponding aligned hole 311b in part 304. The screw may connect parts 302 and 304 and thereby serve as a retention feature to secure structures 310 and 312 during the adhesive application process.

In an embodiment, element 308 is a shim that is glued between parts 302 and 304 in advance of the adhesive application process. The shim and the screw may be made of electrically conducting or isolating material depending on whether electrical conductivity or isolation is desired between parts 302, 304 and structures 310, 312. In the case where electrical isolation is specified, the shim 308 and screw 314 may be composed of nylon or another isolating material. Shim 308 and/or screw 314 may also be selected to define the space between parts 302 and 304, and thus between structures 310 and 312. Where parts 302, 304 or structures 310, 312 are composed of similar materials that can give rise to galvanic corrosion if contact is made, the shim and screw may provide a space sufficient to maintain separation of parts 302, 304 or structures 310, 312.

Once the screw is inserted into holes 311a and 311b (which may be treaded during a 3-D printing process in one embodiment to secure the screw) and the shim 308 is glued, adhesive can be applied and can be allowed to cure while the screw holds the overall combined structure into place. The thickness profile of the parts 302 and 304 can be minimized and is limited only by the size of the screw required to counter the forces due to the application and/or curing of the primary adhesive thereafter inserted in interface 306.

FIG. 4A is a side view of two AM parts 402 and 404 joined at an interface 406 using a snap ring 412 in an exemplary embodiment. FIG. 4B is a top view of the two AM parts of FIG. 4A. While two AM parts are illustrated in this embodiment, one of the parts may include a non-AM structure such as a tube, panel, extrusion, and the like. In an embodiment, the AM parts 402 and 404 are nodes.

For clarity and to illustrate the concepts disclosed herein, the nodes 402, 404 have been simplified to form generally rectangular shapes (cubic in three dimensions) that meet at interface 406. While the sides of each node 402, 404 are shown as flush at the interface 406, this need not be the case and in other embodiments, a gap may be positioned therebetween, e.g., to provide an adhesive region, to mitigate galvanic corrosion, etc.

Node 402 may be 3-D printed to include four hollow regions even distributed near different corners of the rectangular cube, two of which (410a and 41b) are viewable from the orientation in FIG. 4A. In this embodiment, a sealant has been applied in each region, including regions 410a and 410b, prior to joining the nodes 402, 404 at interface 406. The sealant may cure to form a rubberlike substance which exerts a positive pressure across the interface (e.g., from left to right in the figure). In the absence of any restoring force, the curing of the sealant in regions 410a and 410b may cause the sealant to extend out into the interface 406, thereby separating node 402 from 404.

Node 402 may further be 3-D printed to include a semi-circular shaped protrusion 407 that juts out of the plane of the drawing relative to the vantage point of the viewer. Likewise, node 404 includes a complementary semi-circular shaped protrusion 408 that meets with protrusion 407 at interface 406 to form a circular protrusion. FIG. 4B, which shows the top view of the node pair of FIG. 4B, shows a clearer view of protrusions 407 and 408 extending outward relative to nodes 402, 404. Referring back to FIG. 4A, snap ring 412 is shown placed over the semi-circular protrusions 407, 408. A different perspective of the snap ring 412 is shown in FIG. 4B. The snap ring is in fact inserted into a gradual groove embedded into and around the corners of the semi-circular protrusions 407, 408. The groove has a small gradient and is covered mostly by snap ring 412, thus it is not visible in the figure. However, FIG. 4B shows that the thickness of the semi-circular protrusions extending out of nodes 402 and 404 is a value d. In an exemplary embodiment, d can be made small, and only large enough as is necessary to provide for placement of the snap ring in the surrounding groove. Therefore, the profile of the snap ring in this embodiment is advantageously low.

The snap ring 412 can be used along with one or more additional snap rings (omitted for clarity) disposed on one or more of the three remaining sides of the rectangle corresponding to the interface 406 between nodes 402 and 404 to secure the nodes 402 and 404 as the sealant is cured. While a sealant application is shown in this example, other examples may alternatively or additionally include the application and/or curing of an adhesive. The snap ring may optionally be removed after the sealant is cured. In some embodiments, the snap ring may remain for providing reinforcement over the lifetime of the part.

Figure 5:
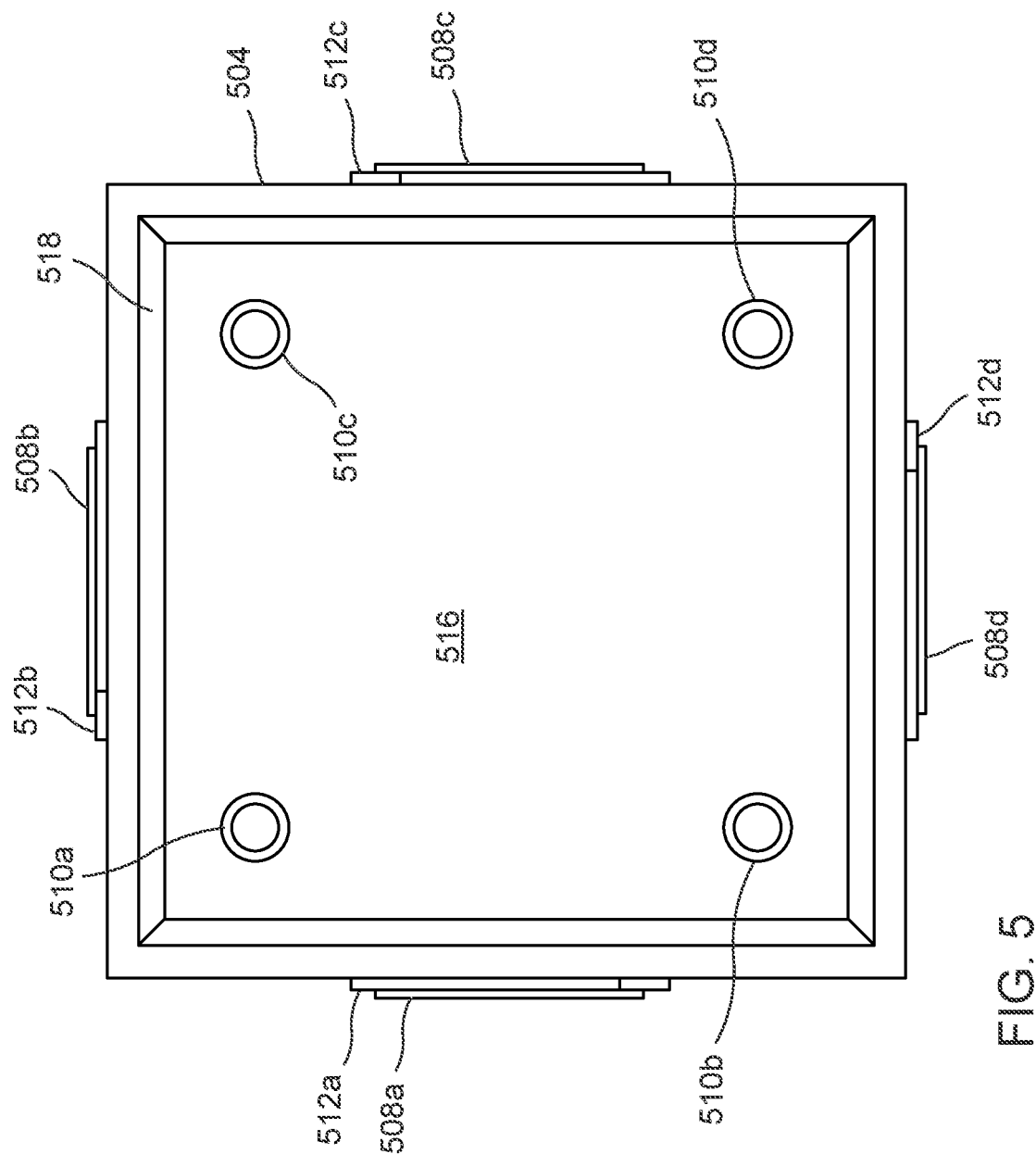
FIG. 5 is a bottom view of one of the AM parts of FIG. 4A with additional snap rings.

FIG. 5 is a view of the rear surface 516 of one of the AM nodes of FIG. 4A with additional snap rings. More specifically, the structure in FIG. 5 is identical to that of FIGS. 4A and 4B, except that four snap rings 512a-d are shown along the respective four sides of the interface between the nodes (here, node 504 corresponding to node 404 is visible). All four sealant regions 510a-d disposed in a node opposite node 504 are also visible. In actuality, a view of the sealant regions would be obscured by node 504, but it is assumed for clarity that the nodes are transparent. The eight semi-circular protrusions are also shown in this view as four circular protrusions 508a-508d, each circular protrusion having a groove for supporting one snap ring 512a-c.

Nodes 402, 404 and 504 in FIGS. 4A-B and 5 are shaped as simple rectangular/cubic structures for purposes of simplicity. It will be appreciated, however, that nodes 402, 404 and 504 may be as geometrically sophisticated as necessary to suit the application. For example, nodes 402 and 404 may include an adhesive bond region adjacent interface 406. Nodes 402 and 404 may also include adhesive, sealant, and vacuum channels co-printed with the node along with surface ports for receiving effectors to inject adhesive or sealant or to provide negative pressure. Furthermore, the illustrations of FIGS. 4A-B and 5 can be extended to provide a connection between an AM part and virtually any other structure, including a conventionally-manufactured panel, tube, extrusion, or other structure. In addition, while a snap ring is shown for illustrative purposes, the disclosure is not so limited and other means may be equally suitable for adjoining the protrusions. Among numerous other advantages, the embodiments shown in FIGS. 4A-B and C advantageously allow AM to form the basis for the part retention feature to maintain a lower, more streamlined profile than conventional techniques.

In another aspect of the disclosure, one or more clips having a spring-loaded internal component may be used as a retention feature for stabilizing and securing a plurality of parts to be combined. FIG. 6 is a top view of such a clip 606 and of four parts 610a-d coupled together using three spring-loaded clips 606a-c as part retention features. The four parts 610a-d are assembled together at vertical and horizontal interfaces 627x, 627y using the three clips 606-a-c. A plurality of adhesive bond regions 614 are shown at interfaces 627x, 627y in which a primary adhesive may be applied during an adhesive injection process. In an embodiment, parts 610a-d are 3-D printed and the adhesive bond regions 614 are formed using AM. In another embodiment, at least one of the parts 610a-d is a non-3-D printed component, such as a conventionally-manufactured panel.

As shown in the exploded view referenced by the left-pointing arrow, the clips 606a-c may be pre-loaded with a springy component 613 that gives the pins 625a-b elasticity. The springy component 613 may include a metallic core that naturally tends to compress the pins 625a, 625b of the clip 606 inward relative to each other. The springy component 613 allows the clip 606 to serve as a part retention feature when it is placed into corresponding apertures, notches, or other receptacle features on the parts 610a-d. The clips 606 may be used to hold parts 610a-c together during adhesive injection and, in some embodiments, during a subsequent adhesive curing period. Even though the clips 606 are pre-loaded with springy components 613 that cause the pins 625a, 625b to compress inward, the pins 625a, 625b may be straightened out by the force exerted on the pins due to the location of their connection to the parts 610a-d.

When connected, the clips 606a-c continue to apply a stabilization force. For example, clip 606a exerts a force on parts 610a and 610d that pushes them inward at interface 627x. Similarly, clip 606b exerts a force on parts 610a and 610d that pushes them inward at interface 627y. The clips 606a-c may be left in or removed after curing of the adhesive in adhesive bond regions 614. The clips 606a-c may include a plastic outer covering so that they do not scratch the parts 610a-d. In some embodiments, the clip 606 may be an extrusion such that smaller clips can be cut.

FIG. 7 is a partial perspective view of two parts 710a, 710b coupled together using clips 706 as part retention features. Clips 706 have an advantageously simple but effective compression element, may be constructed to be low profile by shortening pin length or by increasing the depth of the pin apertures, can be automatedly applied to the part, and may be left on the resulting part or removed as desired. In an embodiment, the pin apertures are 3-D printed along with the part.

Figure 8:
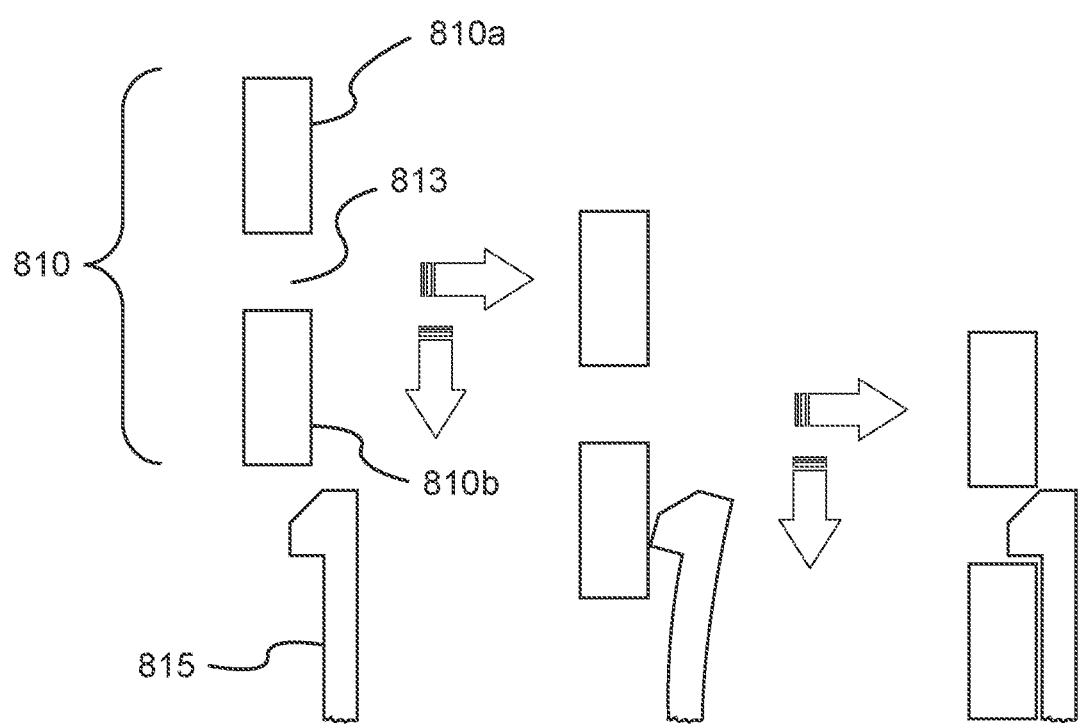
FIG. 8 is a conceptual side view of an AM snap-like part retention feature slidably engaging with a receptacle on an another part.

In another aspect of the disclosure, snap-like features may be built directly into the part using 3-D printing. These features may have an elastic snap-like behavior that enables automatic insertion upon moving to parts relative to one another. FIG. 8 is a conceptual side view of snap-like part retention feature 815 slidably engaging with a receptacle 813 on a separate part 810. Part 810 may be a node, panel, tube, extrusion or other additively or conventionally manufactured structure. For clarity, only two outer walls of part 810 are included in the illustration. In an embodiment, snap feature 815 may be co-printed with a corresponding AM node (see FIG. 9). Snap feature 815 may be configured to deflect into a receptacle/feature on part 810 being connected. In the leftmost view as shown by the downward arrow, part 810 may be moved relative to snap feature 815 (or vice versa) such that snap feature 815 is deflected to clear part 810 and snap feature 815 slidably engages with a lower wall 810b of part 810. In the middle view, part 810 continues to move downward as a protruding portion of snap feature 815 approaches the receptacle. In the rightmost view, the snap feature 815 may engage with the receptacle 813 by the elastic force present in the snap feature and caused by the initial exertion of snap feature 815 to the right by part 810. In an embodiment, the receptacle 813 is machined into part 810.

Figure 9:
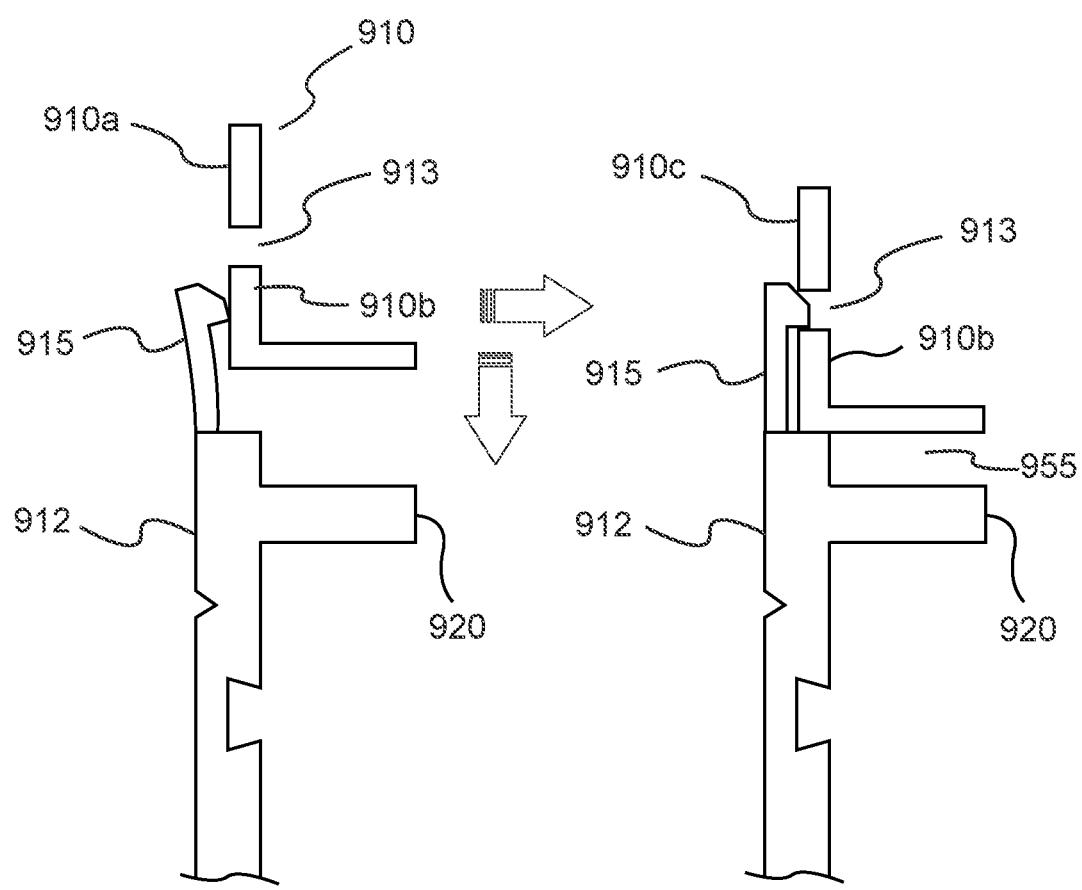
FIG. 9 is a side view of an AM snap-like part retention element slidably engaging with a receptacle on another part.

FIG. 9 is a side view of an AM snap-like part retention element 915 slidably engaging with a receptacle 913 on another part 910. In the embodiment shown, snap-like element 915 is co-printed with AM node 912. Among other features omitted from view, node 912 may include an upper wall 920. In the leftmost view, snap-like feature 915 may deflect to clear part 910, then may slidably engage the bottom portion of part 910 similar to that shown in FIG. 8. In the rightmost view, snap-like feature 915 engages with receptacle 913 of part 910. As in FIG. 8, receptacle 913 may include an aperture machined into part 910, the latter of which may include a panel, node, extrusion, tube, and the like.

As shown, when the snap-like feature fits into the receptacle 913, the wall 912' of node 912 is brought into close proximity to corresponding wall 910b. Between wall 920 and 910b is interface 955, into which an adhesive and/or sealant may be injected to bond node 912 with part 910. During the adhesive application, snap-like feature 915 may remain securely within 915 to hold the interface together in the face of any positive pressure exerted on walls 910b and 912 via the adhesive application. Likewise, the engagement of snap-like feature 915 with receptacle 913 may remain during curing of the adhesive to avoid separation of the parts. Notably, an upper protrusion of node 912 abutting snap-like feature 915 may be used to define the width of interface 955.

Figure 10:
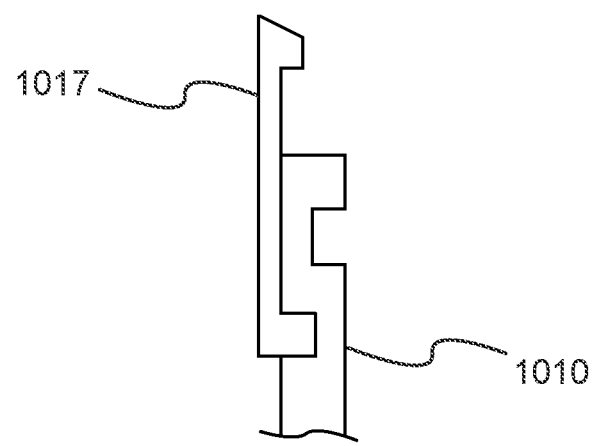
FIG. 10 is side view of a clip attached to the end of an AM part after 3-D printing to form a snap-like part retention element.

FIG. 10 is side view of a clip 1017 attached to the end of an AM part 1010 after 3-D printing to form a snap-like part retention element. In this embodiment, clip 1017 may be attached to the node after completion of the print of part 1010. That is, clip 1017 may be installed to the part (such as a node) via a secondary installation process, as opposed to co-printing the clip 1017. This embodiment may be particularly useful in instances where the part 1010 and the connecting components are made of different materials and galvanic corrosion prevention is required. The clip 1017 may be made of an insulating material to prevent galvanic corrosion.

Figure 11:
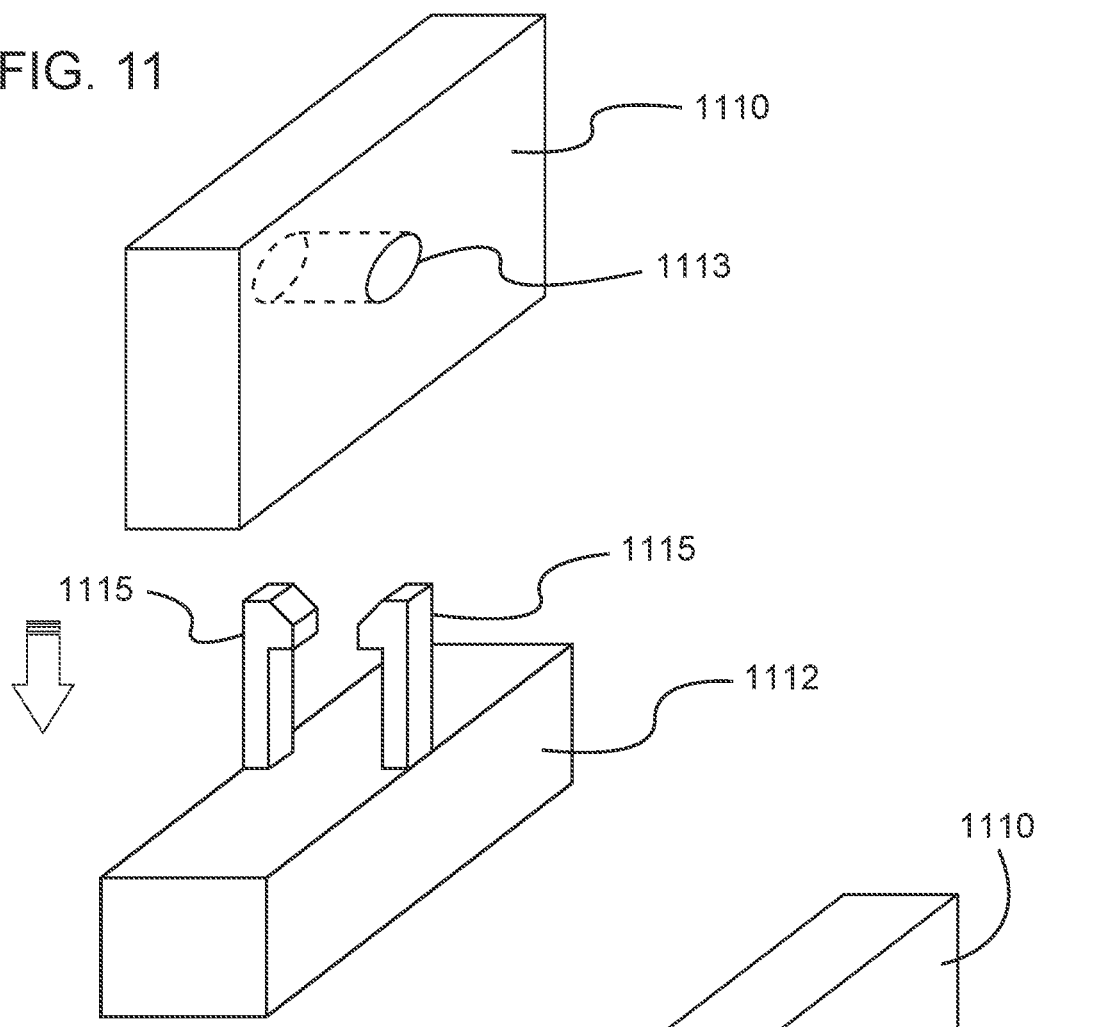
FIGS. 11-13 are perspective views of an AM node using a snap-like retention element to engage with a panel for enabling adhesive application and/or curing.
Figure 12:
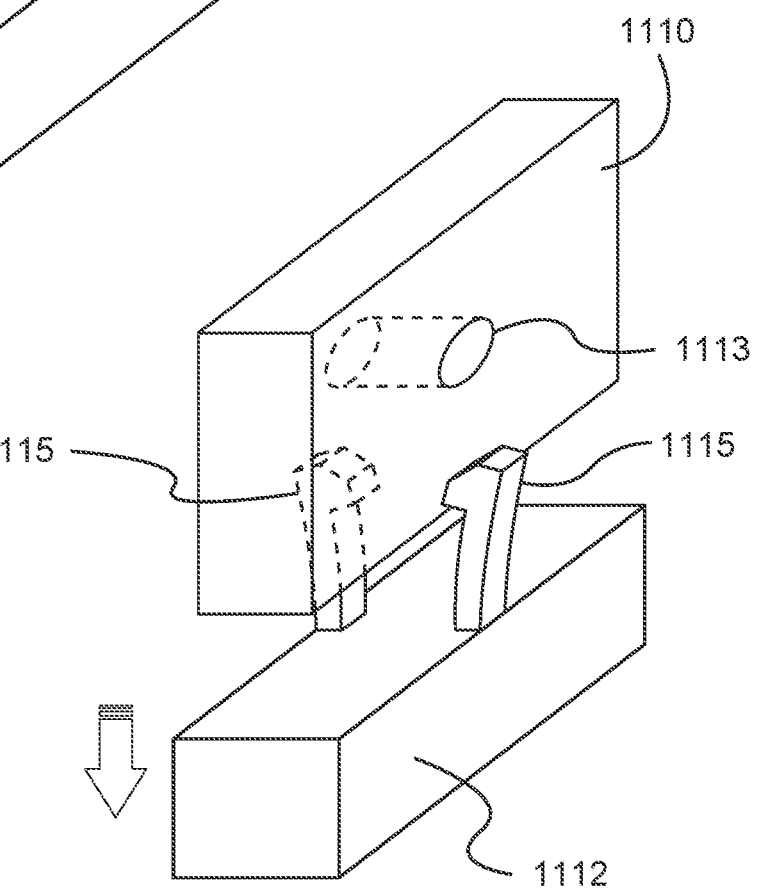
Figure 13:
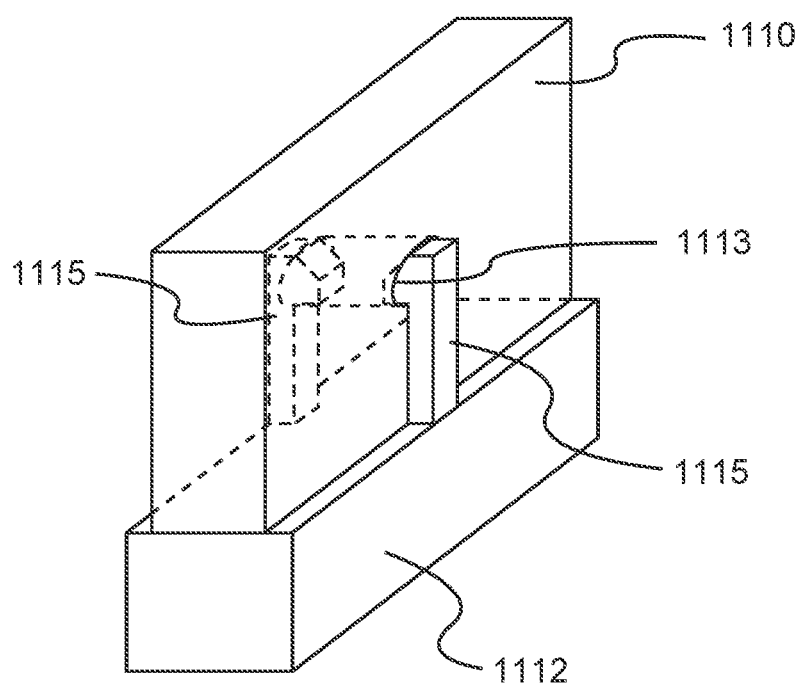

FIGS. 11-13 are perspective views of an AM node 1112 using snap-like retention element 1115 to engage with a panel 1110 for enabling adhesive application and/or curing. FIGS. 11-13 are not necessarily drawn to scale, but instead are intended to highlight key concepts of the disclosure. In FIG. 11, as described above, the node 1112 and panel 1110 are brought into proximity. In FIG. 12, as the node 1112 and panel 1110 move closer together, elements 1115 are deflected by the rear portion of panel 1110. As the parts 1110 and 1112 are brought closer, the elements 1115 move toward hole 1113. For simplicity, hole 1113 is shown as protruding through the panel 1110; however, this need not be the case and a separate aperture may instead be dedicated to each side of the panel 1110. As shown in FIG. 13, the elements 1115 slidably engage with a side of the panel 1110 via the hole 1113.

In embodiments involving an adhesive connection, node 1112 may include one or more adhesive bond regions adjacent the node-panel interface. Node 1112 may further include one or more adhesive, sealant or vacuum channels, and one or more surface ports to enable a robot effector to inject adhesive, sealant, and/or positive pressure into the adhesive bond regions via the channels. Node 1112 may also be made of any shape and may include other functionality as deemed suitable for the embodiment. Panel 1110 may be molded, cast, constructed via a composite layup, additively manufactured, etc. Elements 1115 operate to secure the panel and node during the adhesive application process and, in some embodiments, the subsequent curing process. After adhesive curing, elements 1115 may be removed or optionally they may be retained.

In the node-to-panel connection shown in FIGS. 11-13, the features used in both the adhesive application process and the part retention process may advantageously be additively manufactured right into the node 1113. The only additional features used in these embodiments are apertures, which if not 3-D printed, may be punched, drilled or otherwise formed in the panel 1110. In an exemplary embodiment, snap feature 1115 is composed of a strong but elastic element to enable 1115 to have a thin profile such that the bulk of element 1115 enters the aperture. A more streamlined profile for adhering the node to the panel may result.

Figure 14:
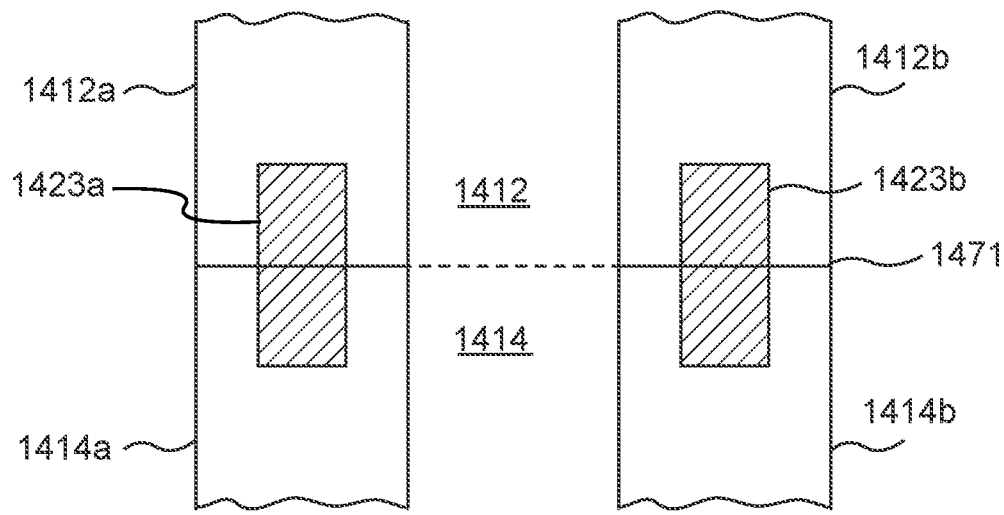
FIG. 14 is a side view of pins press-fit into AM parts to retain the parts during adhesive injection and curing.

In another aspect of the disclosure, pins are press-fit into AM parts. A press-fit is a fastening between two parts by friction. FIG. 14 is a side view of pins 1423*a-b* press-fit into AM parts 1412 and 1414 to retain the parts during adhesive injection and curing. The pins may be press-fit into existing recesses co-printed into the AM parts 1412 and 1414 or they may be directly press-fit onto a non-recessed surface of the parts. The press-fitting may be performed manually, or using an automated technique. In the embodiment shown, an AM node 1412 including parts 1412*a* and 1412*b* is inserted adjacent AM node 1414 including parts 1414*a* and 1414*b*. An automated constructor may use a suitable effector to press-fit flat rectangular pin 1423*a* between parts 1412*a* and 1414*a* across interface 1471, and to press-fit flat rectangular pin 1423*b* between parts 1412*b* and 1414*b* across interface 1471. In the embodiment shown, the pins have a low profile, meaning that they are thin and do not jut out far from the node in a direction perpendicular to a plane of the drawing.

While interface 1471 is shown such that the parts 1412 and 1414 abut each other, this need not be the case, and a gap may exist between the parts in other embodiments. A primary adhesive may be applied between the gap, or the adhesive may be applied in other dedicated adhesive bond regions not shown. The pins can either be both physically and electrically isolating or non-isolating in nature. Where the pins are physically isolating as dictated by galvanic corrosion concerns, the pins maintain a gap between the parts 1412 and 1414. A non-isolating embodiment is illustrated. If electrical conduction is desired in the case of a gap, the pins may be made of a suitable conducting material. Conversely, if electrical isolation is needed, the pins may be made of nylon or another electrical insulator. The pins 1423*a* and 1423*b* may retain the parts during adhesive injection and curing.

Figure 15:
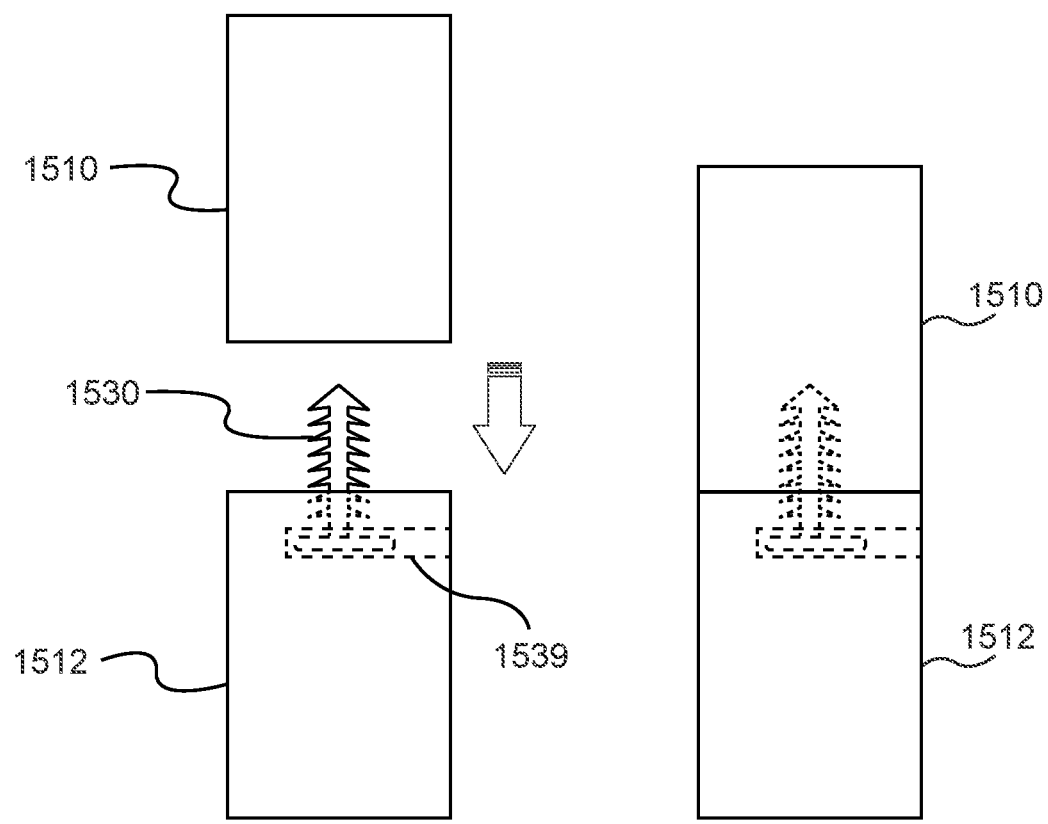
FIG. 15 is side view of a Christmas tree fastener used as a retention feature for AM parts.

In another aspect of the disclosure, a so-called Christmas tree fastener may be used to perform a similar function. FIG. 15 is side view of a "Christmas tree" fastener 1530 used as a retention feature for AM parts 1510 and 1512. Christmas tree fasteners can be fastened at various points using the available branches, and therefore such fasteners can advantageously be used to absorb the tolerance variation in the parts 1510, 1512 being connected. The fastener 1530 may be inserted into a slot 1539 as shown in the leftmost image, which may further augment the tolerance absorption. Thereupon, the fastener 1530 may be used to connect the parts 1510, 1512 using an appropriate set of branches, as shown in the rightmost image. As noted before, in some embodiments, a gap is retained between the parts 1510, 1512, e.g., to receive an adhesive or to avoid corrosion. In alternative embodiments, the primary adhesive is applied at dedicated adhesive bond regions. The fastener 1530 may be used to secure the parts during adhesive application and curing.

Figure 16:
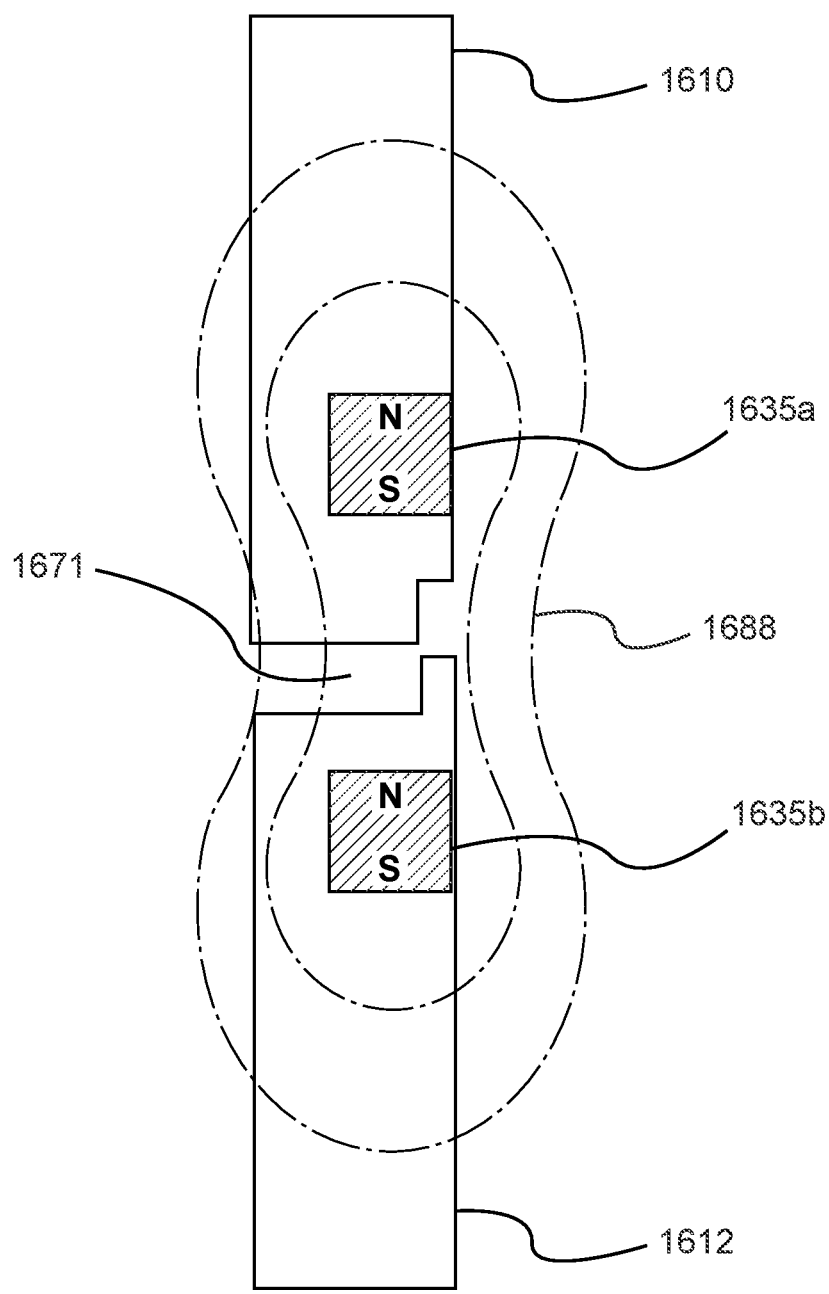
FIG. 16 is a side view of AM parts using magnets as retention features.

In another aspect of the disclosure, forces from permanent magnets may be used to secure two parts during the adhesive injection and curing processes. FIG. 16 is a side view of AM parts 1610 and 1612 using magnets 1635*a* and 1635*b* as retention features. In an embodiment, at least one of the parts 1610 is an AM node. The magnet 1635*a* may be placed in a groove that is co-printed with AM node 1610. A corresponding groove can be co-printed with the connecting node 1612 or, where the part 1612 is a machined structure such as an extrusion, panel, or tube, the magnet 1635*b* can be inserted in a groove machined into the part 1612.

In this embodiment, the magnetic field 1688 between the two parts 1610, 1612 to be joined by a primary adhesive should provide enough clamping force to overcome any positive pressure caused by the adhesive injection step or the subsequent curing process. As long as the force of the magnetic field 1688 is greater than the pressure generated between the parts when adhesive is applied, the magnets 1635*a*, 1635*b* and the generated magnetic field 1688 extending across part interface 1671 may make for an effective retention feature. Similarly, the magnets 1635*a*, 1635*b* should be strong enough to counter a force applied via expansion of the adhesive due to curing, if the magnets are used for this purpose.

Figure 17:
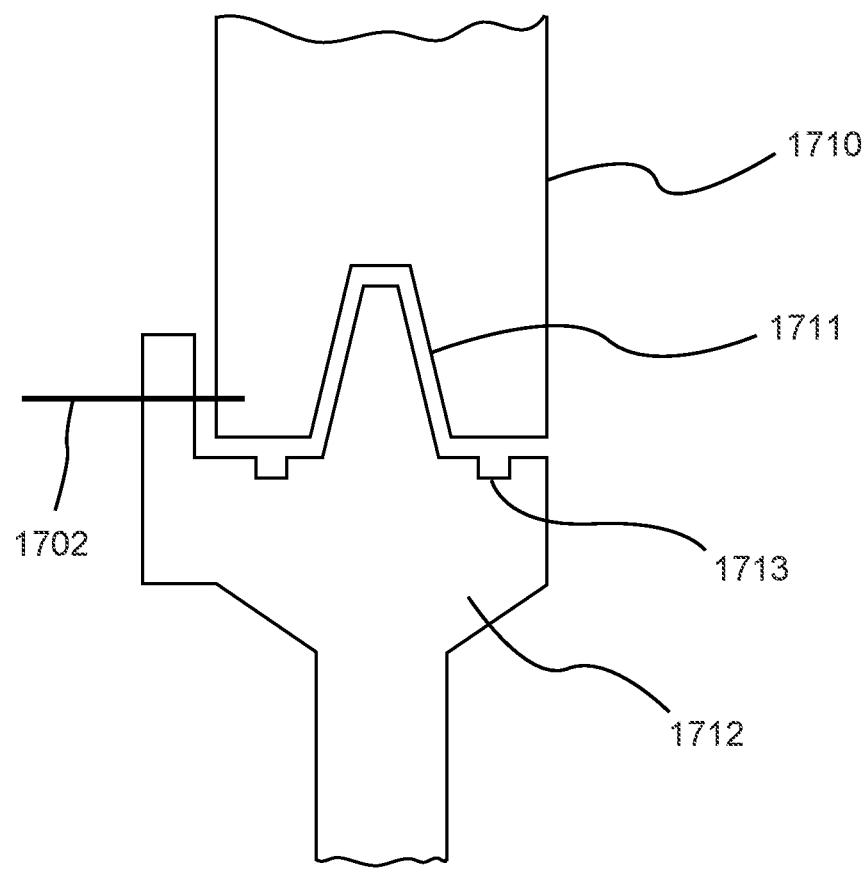
FIG. 17 is a front view of two AM parts aligned with a tongue and groove connection and using a cleco as a part retention element prior to adhesive application.

In another aspect of the disclosure, clecos are used as part retention features during adhesive application and curing. A cleco is a temporary fastener developed by the Cleveland Pneumatic Tool Company. Clecos may fit through holes in the relevant parts and may expand on one side to maintain the parts in proximity without causing distortion. FIG. 17 is a front view of two AM parts 1710, 1712 aligned with a tongue and groove connection 1711 and using a cleco 1702 as a part retention element prior to adhesive application. Appropriate features, such as holes, cavities, recesses, etc., may be co-printed or pre-machined on the nodes/components being connected. The cleco(s) may be used to secure parts 1710, 1712 during application of a sealant in grooves 1713 to contain an adhesive, application of an adhesive between the tongue and groove connection 1711, and curing of the adhesive.

In an embodiment, a robot using a suitable effector may install clecos through the features, thereby securely retaining the parts. The clecos may be delivered to the robot from a reservoir or container housing clecos. For a node-to-panel connection, the cleco can be inboard of the joint on one side.

Figure 18:
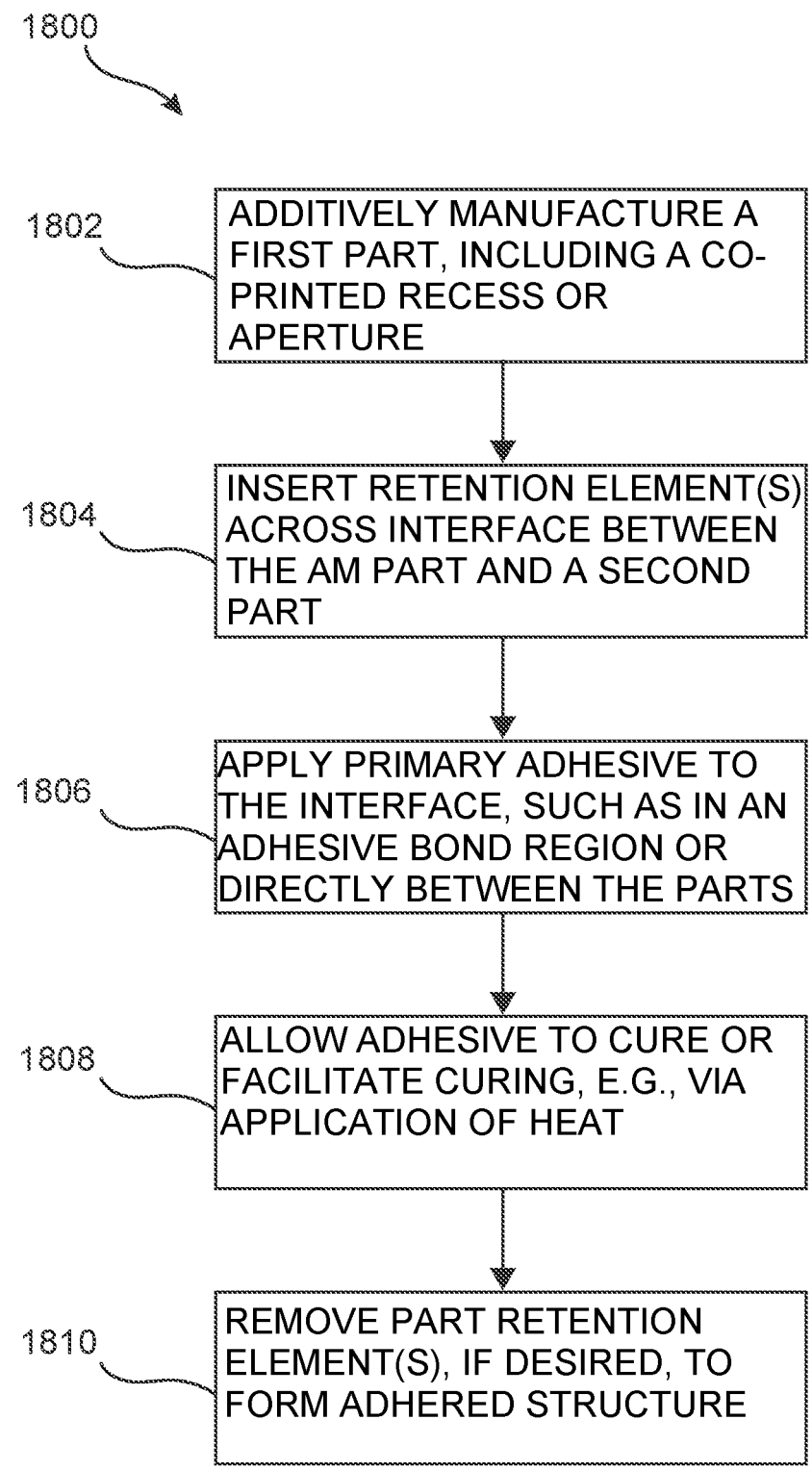
FIG. 18 is a flow diagram of an exemplary process for adhering an AM structure with another structure.

FIG. 18 is a flow diagram illustrating a method for using part retention features. Using a suitable 3-D printing technique, a first part is additively manufactured that includes, in an embodiment, a co-printed recess, aperture, hole, cavity, groove or other feature that is configured to receive a part retention feature (step 1802). Thereupon, one or more part retention elements/features are inserted across an interface between the first AM part and a second part that has been positioned proximate (or to adjoin) the first AM part (step 1804). The second part may be any of another AM part or node, or a conventionally manufactured panel, tube, extrusion or other structure.

After the part retention elements/features are in place, a primary adhesive can be applied to the interface, such as in a dedicated adhesive bond region or otherwise in the space between the parts (step 1806). In various embodiments, a sealant is also applied as well as negative pressure to form a vacuum. The first AM node may include one or more channels and ports for facilitating the flow of adhesive to the interface.

The adhesive may then be allowed to cure, whether through the passage of time or via the application of heat or another method (step 1808). During both the application and the curing of the adhesive, the parts are held in place at a desired position and/or distance using the part retention element(s)/feature(s). Where a sealant is applied prior to the adhesive, the sealant is generally allowed to cure to form spatial boundaries for the adhesive flow.

The part retention element(s) can thereafter optionally be removed to form the adhered structure (step 1810). In other embodiments, the pins, magnets, clecos, fasteners, rings or other part retention elements can be maintained on the combined structure. This removes another manufacturing step and can be contrasted with the conventional use of standoff tabs, whereby the profile of the latter is generally too large to justify keeping them in place. In still other embodiments, the retention features may be removed to eliminate additionally parts that can potentially come loose cause failures in various components of the transport structures, or they may be removed to minimize mass and volume.

The previous description is provided to enable any person skilled in the art to practice the various aspects described herein. Various modifications to the exemplary embodiments presented throughout this disclosure will be readily apparent to those skilled in the art, and the concepts disclosed herein may be applied to other solar vehicles and for techniques for additively manufacturing structures within solar vehicles. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   a first additively manufactured (AM) part connected to a second part via an adhesive applied at an interface between the first and second parts; and
   a snap ring arranged for placement across the interface and securing the first and second parts during at least application of the adhesive or curing of the adhesive,
   wherein the first and second parts each comprise a protrusion, each protrusion having a generally continuous groove and a generally flat portion,
   wherein each groove having a shape configured to receive the snap ring, and
   wherein the flat portion of the protrusion corresponding to the first part configured to be flush, at least in part, against the flat portion of the protrusion corresponding to the second part when the first and second parts are positioned for connection via the adhesive.

2. The apparatus of claim 1, wherein the first AM part comprises a first interface feature configured to connect to a second interface feature of the second part, and
   wherein the interface is defined at least in part by the first and second interface features.

3. The apparatus of claim 1, wherein a length of each protrusion from its respective part comprises a value comparable to a thickness of the snap ring and just large enough to accommodate the snap ring.

4. An apparatus, comprising:
   a first additively manufactured (AM) part connected to a second part via an adhesive applied at an interface between the first and second parts; and
   a clip arranged for placement across the interface and securing the first and second parts during at least application of the adhesive or curing of the adhesive,
   wherein the clip further comprising an elastic element pre-loaded to apply a force in a direction that secures the first and second parts.

5. The apparatus of claim 4, wherein the first and second parts include a plurality of corresponding apertures distributed along respective sides of the interface and into which clips comprising the elastic element are inserted.

6. The apparatus of claim 4, wherein the clip further comprising pins and the elastic element provides the pins elasticity.

7. An apparatus, comprising:
   a first additively manufactured (AM) part connected to a second AM part via an adhesive applied at an interface between the first and second parts,
   wherein the first and second parts comprise opposing grooves adjacent the interface, each of the grooves containing a magnet oriented to create an attractive magnetic force across the interface for securing the first and second parts.

8. The apparatus of claim 7, wherein
   the first part comprises a node,
   the second part comprises a panel, and
   at least one cleco is positioned on an interior side of the node relative to the panel.

9. An apparatus, comprising:
   a first additively manufactured (AM) part connected to a second part via an adhesive applied at an interface between the first and second parts; and
   a snap feature arranged for placement across the interface and securing the first and second parts during at least application of the adhesive or curing of the adhesive,
   wherein the snap feature is coupled to the first part, engages a corresponding receptacle on the second part, and deflects into the receptacle when the snap feature is slidably moved along a surface of the second part.

10. An apparatus, comprising:
    a first additively manufactured (AM) part connected to a second part via an adhesive applied at an interface between the first and second parts, the first part comprising a groove and the second part comprising an element extending into the groove and across the interface; and
    clecos connected to the first and second parts and positioned across the interface at a plurality of regions.

* * * * *